(12) United States Patent
Zillessen et al.

(10) Patent No.: US 11,485,887 B2
(45) Date of Patent: Nov. 1, 2022

(54) LIGHT-FIXABLE AND HEAT-CURING COMPOUNDS BASED ON EPOXY RESINS AND THIOLS

(71) Applicant: DELO INDUSTRIE KLEBSTOFFE GMBH & CO. KGAA, Windach (DE)

(72) Inventors: Andreas Zillessen, Augsburg (DE); Sabrina Roediger, Herrsching (DE); Bastian Sueveges, Windach (DE); Robert Born, Gilching (DE)

(73) Assignee: DELO INDUSTRIE KLEBSTOFFE GMBH & CO. KGAA, Windach (DE)

( * ) Notice: Subject to any disclaimer, the term of this patent is extended or adjusted under 35 U.S.C. 154(b) by 316 days.

(21) Appl. No.: 16/772,500

(22) PCT Filed: Nov. 23, 2018

(86) PCT No.: PCT/EP2018/082303
§ 371 (c)(1),
(2) Date: Jun. 12, 2020

(87) PCT Pub. No.: WO2019/115203
PCT Pub. Date: Jun. 20, 2019

(65) Prior Publication Data
US 2020/0385513 A1 Dec. 10, 2020

(30) Foreign Application Priority Data
Dec. 13, 2017 (DE) .......................... 102017129780.4

(51) Int. Cl.
| | |
|---|---|
| *C09J 163/00* | (2006.01) |
| *C09D 163/00* | (2006.01) |
| *C08L 63/00* | (2006.01) |
| *C08G 59/66* | (2006.01) |
| *C08G 59/68* | (2006.01) |
| *C09D 7/61* | (2018.01) |
| *C09D 7/63* | (2018.01) |
| *C08G 59/18* | (2006.01) |
| *C08G 59/24* | (2006.01) |
| *C08K 3/36* | (2006.01) |
| *C08K 5/13* | (2006.01) |
| *C08K 5/43* | (2006.01) |
| *C08K 13/02* | (2006.01) |
| *C09J 11/04* | (2006.01) |
| *C09J 11/06* | (2006.01) |
| *C09K 3/10* | (2006.01) |
| *C08F 222/10* | (2006.01) |

(52) U.S. Cl.
CPC .......... *C09J 163/00* (2013.01); *C08G 59/184* (2013.01); *C08G 59/245* (2013.01); *C08G 59/66* (2013.01); *C08K 3/36* (2013.01); *C08K 5/13* (2013.01); *C08K 5/43* (2013.01); *C08K 13/02* (2013.01); *C09D 7/61* (2018.01); *C09D 7/63* (2018.01); *C09D 163/00* (2013.01); *C09J 11/04* (2013.01); *C09J 11/06* (2013.01); *C09K 3/10* (2013.01); *C08F 222/102* (2020.02); *C08F 222/1063* (2020.02); *C09K 2200/0247* (2013.01); *C09K 2200/0488* (2013.01); *C09K 2200/0647* (2013.01)

(58) Field of Classification Search
None
See application file for complete search history.

(56) References Cited

U.S. PATENT DOCUMENTS

| | | | |
|---|---|---|---|
| 2,666,787 | A | 1/1954 | Krzikalla |
| 3,484,466 | A | 12/1969 | Sayigh et al. |
| 7,625,933 | B2 | 12/2009 | Liu et al. |
| 10,227,445 | B2 | 3/2019 | Koebler et al. |
| 10,752,782 | B2 | 8/2020 | Loccufier |
| 2002/0022713 | A1 | 2/2002 | Tanaka et al. |
| 2006/0149025 | A1 | 7/2006 | Burckhardt |
| 2007/0096056 | A1 | 5/2007 | Takeuchi et al. |
| 2010/0279121 | A1 | 11/2010 | Burckhardt et al. |
| 2012/0107519 | A1 | 5/2012 | Klinkenberg et al. |
| 2015/0266996 | A1 | 9/2015 | Koebler et al. |
| 2017/0355858 | A1 | 12/2017 | Loccufier |
| 2020/0208020 | A1* | 7/2020 | Larson .................... B32B 27/38 |

FOREIGN PATENT DOCUMENTS

| | | | |
|---|---|---|---|
| CN | 1608089 | A | 4/2005 |
| CN | 101918467 | A | 12/2010 |
| CN | 102134449 | A | 7/2011 |
| CN | 102361899 | A | 2/2012 |
| CN | 103305131 | A * | 9/2013 ............... C09J 4/02 |
| CN | 107001828 | A | 8/2017 |
| DE | 102012015729 | A1 | 5/2014 |
| DE | 112013003942 | B4 | 3/2017 |
| EP | 3075736 | A1 | 10/2016 |
| JP | 2012153794 | A | 8/2012 |

OTHER PUBLICATIONS

Machine translation of CN-103305131-A (no date).*

* cited by examiner

*Primary Examiner* — Michael J Feely

(74) *Attorney, Agent, or Firm* — McNees Wallace & Nurick LLC

(57) ABSTRACT

The invention relates to a composition that is liquid at room temperature, can be fixed by radiation and cured by heat, comprising the following components: (A) an at least bifunctional epoxy-containing compound; (B) an at least bifunctional thiol; (C) a radiation-curable compound; (D) a photoinitiator; (E) a stabilizer blend that contains at least one sulfonyl isocyanate and at least one acid; and (F) a nitrogen compound as an accelerator. The compositions are processable at room temperature over a period of at least 24 h and can be completely cured even at low temperatures.

23 Claims, No Drawings

# LIGHT-FIXABLE AND HEAT-CURING COMPOUNDS BASED ON EPOXY RESINS AND THIOLS

FIELD OF THE INVENTION

The present invention relates to a one-pack composition that is liquid at room temperature, can be fixed by radiation and cured by heat. The composition comprises an at least bifunctional epoxy compound, an at least bifunctional thiol as a curing agent for the epoxy compound, a radiation-curable compound, a photoinitiator, an accelerator and a stabilizer.

Additionally, the invention relates to a method for the joining, coating or casting of substrates using the one-pack composition.

TECHNICAL BACKGROUND

For example, epoxy compositions with thiol-based curing agents are disclosed in U.S. Pat. No. 6,153,719 A and characterized by high reactivity and a short processing time at room temperature. For this reason, the described compositions are preferably provided as two-pack systems in which the epoxy component is stored separately from the reactive curing agent component.

In addition, one-pack compositions based on epoxy compounds with thiol-based curing agents having a limited storage stability and a short processing time at room temperature are known. From U.S. Pat. No. 5,430,112 it is known that the stability of thiol-curing epoxy compositions at room temperature can be improved by adding a latent accelerator for epoxy curing that is obtained by reacting a primary or secondary amine with an isocyanate-containing compound to form a urea derivative. Furthermore, the use of solid amine compounds barely soluble in the epoxy matrix at room temperature as an accelerator is described. However, the known epoxy compositions are not radiation-curable.

U.S. Pat. No. 6,232,426 B1 and U.S. Pat. No. 7,479,534 B2 disclose thiol-curable epoxy compositions containing a slightly soluble nitrogen compound as a latent accelerator and, additionally, a Lewis acid compound from the group of titanates and/or borates as a stabilizer for the improvement of storage stability.

Another proposal for the improvement of the stability of thiol-curing epoxy compositions is described in U.S. Pat. No. 6,653,371 B1. Apart from an epoxy resin, a polythiol and a latent accelerator based on a nitrogen compound, the inventive formulations additionally contain a solid organic acid. The organic acid is present in the epoxy matrix, dispersed in solid form, below the typical curing temperature of the composition, and has a pKs of 12 or less.

At the same time, the low stability of one-pack compositions with thiol-based curing agents frequently described in the state of the art is the prerequisite for the advantage of a low curing temperature. US 2017/0073459 A1 discloses the use of thiol-curing epoxy compositions which already cure at 80° C., and are thus supposed to be suitable for use in the manufacture of temperature-sensitive parts such as camera modules. In return, these compositions have only a very short processing time at room temperature.

Epoxy compositions suitable for electronic and optical applications should not only have a low curing temperature. Rather, the cured compositions should also have a high stability against temperature and moisture effects. WO 2015/060439 A1 describes the use of a specific ester-free thiol as a curing agent for an epoxy resin to increase the moisture resistance of the cured compositions. An epoxy resin composition with an ester-free thiol based on a glycolurile structure is known from WO 2016/143815 A1.

All thiol-curing epoxy compositions described so far are purely heat-curing compositions. An additional curing option, such as irradiation with actinic radiation, is not available for these compositions. The described compositions are thus not suitable for use in fast processes in which fixing of the compositions is required to guarantee their dimensional stability until and during heat curing.

US 2007/0096056 A1 discloses a one-pack composition which, apart from an epoxy resin, a latent curing accelerator and an at least bifunctional thiol, additionally comprises a radiation-curable compound based on a (meth)acrylate, and a photoinitiator. By combining two curing mechanisms, the compositions are supposed to reliably cure also in shadow zones. However, the proportion of the bifunctional thiol is limited to 5 wt % at most to achieve a sufficient processing time at room temperature. Higher thiol proportions are undesired as they affect the stability of the compositions. However, the limited thiol proportion restricts the freedom of formulation. In addition, the thiol contributes only to a low crosslinking density. Furthermore, as the cured compositions are not or not sufficiently resistant to temperature and moisture due to the preferred use of ester-containing thiols sensitive to hydrolysis, their applicability is further restricted.

The thiol-curing epoxy compositions described in the state of the art thus have either an acceptable storage stability and processing time at room temperature, with a higher curing temperature, or can be cured at a lower temperature, then having only a low storage stability at room temperature. Furthermore, no compositions are described which have a low curing temperature together with a sufficiently long processing time, and successfully combine those properties with a second curing mechanism.

SUMMARY OF THE INVENTION

The object of the invention is to avoid the disadvantages of the compositions known from the state of the art and to provide one-pack compositions which reliably cure at a low curing temperature within a short period, yet still have a sufficient processing time at room temperature.

Furthermore, the compositions should have a good light fixation strength to allow a wide range of applications in which an initial fixation of parts by irradiation with actinic radiation is required prior to processing the parts in further processes.

These objects are achieved according to the present invention by a curable one-pack composition according to claim 1.

Advantageous embodiments of the composition according to the present invention are indicated in the subclaims, which can optionally be combined with each other.

Furthermore, the invention relates to a method for the joining, coating or casting of substrates using the composition according to the present invention. The composition applied to a substrate can be transferred into a dimensionally stable state by irradiation and, optionally temporally decoupled, processed in subsequent processing steps. Then, the irradiated composition can be eventually heat-cured in a furnace process.

A further object of the invention is the use of the composition according to the present invention as an adhesive or sealant for bonding, casting, sealing or coating of substrates, in particular of optical and/or electronic parts.

The one-pack composition according to the present invention is liquid at room temperature and can be fixed by radiation and cured by heat. The composition comprises the following components: (A) an at least bifunctional epoxy-containing compound; (B) an at least bifunctional thiol; (C) a radiation-curable compound; (D) a photoinitiator; (E) a stabilizer blend containing at least one sulfonyl isocyanate and at least one acid; and (F) a nitrogen compound as an accelerator.

The one-pack composition according to the present invention has a sufficient processability at room temperature of preferably at least 24 h, particularly preferably at least 72 h, and can be transferred into a dimensionally stable state by irradiation with actinic radiation. At the same time, the compositions according to the present invention completely cure at a low temperature, preferably from about 60° C. upwards, within a period acceptable for industrial processes, preferably within 90 min. Surprisingly, it was found that the stability of the compositions can be achieved by using a stabilizer blend of a sulfonyl isocyanate and at least one acid without affecting the curing temperature.

DETAILED DESCRIPTION OF PREFERRED EMBODIMENTS

The invention is described in detail below in an exemplary manner on the basis of preferred embodiments which, however, should not be construed in a limiting sense.

According to the present invention, "one-pack" or "one-pack composition" means that the specified components of the composition are present together in a common formulation, i.e. not stored separately from each other.

According to the present invention, "liquid" means that at 23° C. the loss modulus G" determined by a viscosity measurement is larger than the storage modulus G' of the respective composition.

The compositions are considered as "processable" if the viscosity of the respective composition increases by less than 25% during storage at room temperature over a period of at least 24 h, preferably at least 72 hours.

When the indefinite article "a" or "an" is used this also comprises the plural form "one or more" if not explicitly excluded.

"At least bifunctional" means that, per molecule, two or more units of each of the respective functional group mentioned are present.

All weight proportions set out below relate to the total weight of the reactive components (A) to (F). Proportions of non-reactive additives (G), such as fillers or plasticizers, are explicitly not to be considered for the total weight.

Component (A): At Least Bifunctional Epoxy Compound

The at least bifunctional epoxy compound (A) is not further restricted in terms of its chemical structure, and comprises aromatic or aliphatic compounds with at least two epoxy groups in the molecule, such as cycloaliphatic epoxides, glycidyl ethers, glycidyl amines and mixtures thereof.

Bifunctional or higher-functional cycloaliphatic epoxy compounds are known in the state of the art and include compounds bearing both a cycloaliphatic group and at least two oxirane rings. Exemplary representatives are 3-cyclohexenylmethyl-3-cyclohexylcarboxylate diepoxide, 3,4-epoxycyclohexylalkyl-3',4'-epoxycyclohexane carboxylate, 3,4-epoxy-6-methylcyclohexyl-methyl-3',4'-epoxy-6-methylcyclohexane carboxylate, vinylcyclohexene dioxide, bis(3,4-epoxycyclohexylmethyl)adipate, dicyclopentadiene dioxide, 1,2-epoxy-6-(2,3-epoxypropoxy)hexahydro-4,7-methaneindane.

Aromatic compounds can also be used in the compositions according to the present invention. Examples of aromatic epoxy compounds are bisphenol A epoxy resins, bisphenol F epoxy resins, phenol-novolac epoxy resins, cresol-novolac epoxy resins, biphenyl epoxy resins, 4,4'-biphenyl epoxy resins, divinylbenzene dioxide, 2-glycidylphenylglycidyl ethers, naphthalenediol diglycidyl ethers, glycidyl ethers of tris(hydroxyphenyl)methane, glycidyl ethers of tris(hydroxyphenyl)ethane. Furthermore, all completely or partially hydrogenated analogues of aromatic epoxy compounds can be used. Low-halogen or halogen-free bisphenol A and bisphenol F epoxy resins are preferred.

Isocyanurates substituted with epoxy-containing groups and other heterocyclic compounds can also be used as component (A) in the compositions according to the present invention. Examples are triglycidyl isocyanurate and monoallyldiglycidyl isocyanurate.

In addition, polyfunctional epoxy resins of all resin groups mentioned, toughened elastic epoxy resins and mixtures of various epoxy compounds can be used in the compositions according to the present invention.

A combination of several epoxy-containing compounds at least one of which is bifunctional or higher-functional is also in accordance with the invention.

Suitable epoxy-containing compounds (A) are commercially available under the tradenames CELLOXIDE™ 2021P, CELLOXIDE™ 8000 from the company Daicel Corporation, Japan, or EPIKOTE™ RESIN 828 LVEL, EPIKOTE™ RESIN 166, EPIKOTE™ RESIN 169 from the company Momentive Specialty Chemicals B.V., Netherlands, or Epilox™ resins of the product lines A, T and AF of the company Leuna Harze, Germany, or EPICLON™ 840, 840-S, 850, 850-S, EXA850CRP, 850-L of the company DIC K.K., Japan.

In the composition according to the present invention, component (A) is present in a proportion of 5 to 80 wt %, based on the total weight of reactive components (A) to (F).

Component (B): At Least Bifunctional Thiol

The at least bifunctional thiol (B) serves as a curing agent in the composition according to the present invention, and comprises compounds having at least two thiol groups (—SH) in the molecule.

Compound (B) is not further restricted in terms of its chemical structure, and preferably comprises aromatic and aliphatic thiols and combinations thereof.

Preferably, the at least bifunctional thiol is selected from the group consisting of ester-based thiols, polyethers with reactive thiol groups, polythioethers, polythioether acetals, polythioether thioacetals, polysulfides, thiol-terminated urethanes, thiol derivatives of isocyanurates and glycolurile, and combinations thereof.

Examples of commercially available ester-based thiols on the basis of 2-mercaptoacetic acid comprise trimethylolpropane trimercaptoacetate, pentaerythritol tetramercaptoacetate and glycoldimercaptoacetate, available from the company Bruno Bock under the trade names Thiocure™ TMPMA, PETMA and GDMA.

Further examples of commercially available ester-based thiols comprise trimethylolpropane-tris(3-mercaptopropionate), pentaerythritol-tetrakis(3-mercaptobutylate), glycoldi(3-mercaptopropionate) and tris[2-(3-mercaptopropionyloxy)ethyl]isocyanurate, available from the company Bruno Bock under the tradenames Thiocure™ TMPMP, PETMP, GDMP and TEM PIC.

Examples of commercially available thioethers comprise DMDO (1,8-dimercapto-3,6-dioxa-octane), available from the company Arkema S.A., DMDS (dimercaptodiethylsulphide) and DMPT (2,3-di((2-mercaptoethyl)thio)-1-propanethiol), both available from the company Bruno Bock.

With regard to an increased resistance of the cured compositions to temperature and moisture, the use of ester-free thiols is particularly preferred. Examples of ester-free thiols can be found in JP 2012 153 794 A, which is incorporated herein by reference.

The use of tris(3-mercaptopropyl)isocyanurate (TMPI) as a trifunctional ester-free thiol is particularly preferred in the composition according to the present invention. It has been shown that this thiol both guarantees a good resistance to hydrolysis and increases the adhesion on various substrates. According to a particularly preferred embodiment, the at least bifunctional thiol of component (B) thus comprises tris(3-mercaptopropyl)isocyanurate alone or in a mixture with other at least bifunctional thiols.

Ester-free thiols based on a glycolurile compound are known from EP 3 075 736 A1. These can also be used in the compositions according the invention as component (B), alone or in a mixture with other at least bifunctional thiols.

Thiols of a higher functionality which, for example, are obtainable by oxidative dimerization processes of at least bifunctional thiols, can also be used in component (B).

The above list is to be considered as exemplary and non-exhaustive.

The proportion of the at least bifunctional thiol in the composition according to the present invention is preferably 15 to 80 wt %, based on the total weight of reactive components (A) to (F).

Component (C): Radiation-Curing Compound

Preferably, (meth)acrylates are used as a radiation-curing compound in the compositions according to the present invention. These are not further restricted in terms of their chemical structure. For example, both aliphatic and aromatic (meth)acrylates can be used.

The radiation-curing compound (C) guarantees the light fixability of the composition according to the present invention, and bears at least one radically polymerizable group. Preferably, the radiation-curing compound is at least bifunctional. The following radiation-curing compounds, for example, are suitable: Isobornyl acrylate, stearyl acrylate, tetrahydrofurfuryl acrylate, cyclohexyl acrylate, 3,3,5-trimethylcyclohexanol acrylate, behenyl acrylate, 2-methoxyethyl acrylate and other mono- or poly-alkoxylated alkyl acrylates, isobutyl acrylate, isooctyl acrylate, lauryl acrylate, tridecyl acrylate, isostearyl acrylate, 2-(o-phenylphenoxy) ethyl acrylate, acrylolymorpholine, N,N-dimethyl acrylamide, 4-butanediol diacrylate, 1,6-hexanediol diacrylate, 1,10-decanediol diacrylate, tricyclodecanedimethanol diacrylate, dipropyleneglycol diacrylate, tripropyleneglycol diacrylate, polybutadiene diacrylate, cyclohexanedimethanol diacrylate, diurethane acrylate of monomeric, oligomeric or polymeric diols and polyols, trimethylolpropane triacrylate (TMPTA) and dipentaerythritol hexaacrylate (DPHA) and combinations thereof. Acrylates with a higher functionality derived from poly-branched or dendritic alcohols can also be advantageously used.

Analogue methacrylates are also in accordance with the present invention.

Furthermore, compounds with allyl groups, such as 1,3,5-triazine-2,4,6(1H,3H,5H)trione, commercially available as TAICROS™, are suitable. Non-hydrogenated polybutadienes with free double bonds, such as Poly BD® types, can also be used as the radiation-curing compound (C). Additionally, the use of both vinyl ethers and unsaturated polyester resins is possible.

It is further possible to use radiation-curable compounds having a higher molecular weight, such as urethane acrylates based on polyesters, polyethers, polycarbonate diols and/or (hydrogenated) polybutadiene diols, as component (C).

A combination of several radiation-curable compounds is also in accordance with the present invention.

The radiation-curing compound is preferably present in the one-pack composition according to the present invention in a proportion of up to 50 wt %, particularly preferably in a proportion of 10 to 50 wt %.

To achieve a high light fixation strength at short exposure times, the compositions according to the present invention preferably contain at least 15 wt % of an at least bifunctional radiation-curing compound as component (C), based on the total weight of reactive components (A) to (F). Preferably, the at least bifunctional radiation-curing compound is present in the composition according to the present invention in a proportion of 15 to 50 wt %.

The radiation-curing compound can comprise a mixture of a monofunctional radiation-curing compound and an at least bifunctional radiation-curing compound. In this case, the monofunctional radiation-curing compound can be present in a proportion of 0 to 10 wt %, based on the total weight of reactive components (A) to (F).

Component (D): Photoinitiator

Apart from the radiation-curing compound (C), the compositions also contain a photoinitiator (D) to activate radical polymerization. As photoinitiators, the usual commercially available compounds can be used, such as α-hydroxyketone, benzophenone, α,α'-diethoxyacetophenone, 4,4-diethylaminobenzophenone, 2,2-dimethoxy-2-phenyl-acetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoine, benzoine ethylether, benzoine isopropylether, benzoine isobutylether, 2-hydroxy-2-methyl-1-phenyl-propane-1-on, 2-isopropylthioxanthone, dibenzosuberone, 2,4,6-trimethylbenzoyldiphenylphosphine oxide and bisacylphosphine oxide, wherein the photoinitiators mentioned can be used alone or in combination with two or more of the listed compounds.

As UV photoinitiators, for example, the IRGACURE™ types of BASF SE can be used, such as the IRGACURE 184, IRGACURE 500, IRGACURE 1179, IRGACURE 2959, IRGACURE 745, IRGACURE 651, IRGACURE 369, IRGACURE 907, IRGACURE 1300, IRGACURE 819, IRGACURE 819DW, IRGACURE 2022, IRGACURE 2100, IRGACURE 784, IRGACURE 250, IRGACURE TPO, IRGACURE TPO-L types. Furthermore, the DAROCUR™ types from BASF SE can be used, such as the DAROCUR MBF, DAROCUR 1173, DAROCUR TPO and DAROCUR 4265 types.

The photoinitiator used as component (D) in the compositions according to the present invention is preferably activatable by actinic radiation at a wavelength from 200 to 600 nm, particularly preferably from 320 to 480 nm. If required, the photoinitiator can be combined with a suitable sensitizer.

The photoinitiator (D) is preferably present in the compositions according to the present invention in a proportion of 0.01 to 5 wt %, based on the total weight of reactive components (A) to (F).

Component (E): Stabilizer Blend

The compositions according to the present invention contain, as a substantial feature, a stabilizer blend comprising or consisting of at least one sulfonyl isocyanate (E1) and at least one acid (E2).

By combining the two stabilizers it is possible to guarantee a processing time of the compositions according to the present invention of at least 24 h, preferably at least 72 h, at room temperature and, at the same time, to provide complete curing at a low temperature.

The compositions according to the present invention cure completely from a curing temperature of 40 to 100° C., preferably from 60° C. to 90° C., within up to 90 min. Although the time required for a complete curing of the compositions can be further shortened by heating the compositions to a temperature above 100° C., the compositions cannot or can only partially be used for the bonding or casting of temperature-sensitive parts in this case.

Absence of one of the stabilizers results in a massive deterioration of the processing time at room temperature. Thus, the joint use of both stabilizers is crucial for the compositions according to the present invention.

The basic chemical structure of the sulfonyl isocyanate (E1) is not further restricted as long as the compound has at least one sulfonyl isocyanate group —$SO_2$(NCO) as a functional group. The sulfonyl isocyanate group can be bound to an aliphatic or aromatic residue. The production of sulfonyl isocyanates is known from U.S. Pat. No. 3,484,446 or 2,666,787.

The aliphatic sulfonyl isocyanate can comprise a linear or branched alkyl residue with 1 to 18 C-atoms, preferably with 4 to 8 C-atoms.

Preferably, the sulfonyl isocyanate (E1) comprises an aromatic sulfonyl isocyanate, particularly preferably a monofunctional arylsulfonyl isocyanate. The aryl residue can optionally be an alkyl-substituted or unsubstituted phenyl residue, naphthyl residue or bisphenyl residue. For example, aromatic sulfonyl isocyanates are obtainable by reacting arylsulfonamides with phosgene, optionally in the presence of aliphatic isocyanates.

The sulfonyl isocyanates can be used as a single compound or in a mixture of two or more sulfonyl isocyanates.

Particularly preferably, the sulfonyl isocyanate (E1) in the stabilizer blend (E) comprises p-toluene sulfonyl isocyanate alone or in a mixture with other sulfonyl isocyanates.

The sulfonyl isocyanate (E1) is preferably present in the composition according to the present invention in a proportion of 0.01 wt % to 1 wt %, based on the total weight of reactive components (A) to (F), preferably in a proportion of 0.01 to 0.5 wt %.

Generally, as an acid (E2), each acidic compound that is able to transfer protons can be used. Preferably, the acid has a pKs of 12 or less, particularly preferably 10 or less. In particular, the pKs value of the acid is below the pKs value of the corresponding acid of the accelerator (F). Preferably, the acid (E2) is an organic acid.

Suitable acids are, for example, 3,4-dihydroxybenzoic acid, 3,4,5-trihydroxybenzoic acid, pamoic acid, citric acid, phenylboronic acid, Meldrum's acid, phloroglucinol, fumaric acid, ascorbic acid, salicylic acid, 3,4-dihydroxycinnamic acid, quinone derivatives of enolizable acids, acidic phenols and/or organophosphorous acids. However, the above list is to be considered as exemplary and non-exhaustive.

Preferably, the acid also comprises or consists of an acidic phenol with a pKs of 9.0 or less. Particularly preferably, the acid comprises pyrogallol alone or in a mixture with another acidic phenol and/or another of the abovementioned acids.

The combination of two or more acids (E2) and/or two or more sulfonyl isocyanates (E1) is also in accordance with the invention.

In the composition according to the present invention, the acid (E2) is preferably present in a proportion of 0.01 wt % to 1 wt %, based on the total weight of reactive components (A) to (F), particularly preferably in a proportion of up to 0.5 wt %.

Component (F): Accelerator

The compositions according to the present invention contain, as a further component (F), a curing accelerator. Both solid and liquid accelerators can be used. Preferably, the accelerator is a heat-latent accelerator that is activated by heating to the heat-curing temperature and releases a basic compound. Suitable as an accelerator are all compounds which are also known as latent curing agents for epoxy compounds and are suitable for addition crosslinking with the epoxy compound at the heat-curing temperatures. At room temperature, the accelerator is preferably present in the composition in a dispersed solid form. Additionally, heat-latent liquid accelerators can be used, in particular liquid accelerators with blocked amine groups which are transferred into the free amine compound during heating.

Preferably, the accelerator is a nitrogen-containing compound, particularly preferably a compound selected from the group of amines, ureas, imidazoles, triazine derivatives, polyamido-amines and/or guanidines.

Moreover, adducts and/or reaction products of epoxides or isocyanates with the nitrogen compounds mentioned can be used as an accelerator, in particular reaction products with amines as already described in U.S. Pat. No. 5,430,112.

Examples of commercially available accelerators are Ajicure PN-H, Ajicure MY-24, Ajicure MY-25, Ajicure PN-23 (available from the company Ajinomoto Co., Inc. Tokyo, Japan); Fujicure FXR1081, FXR1020, FXR1030 (available from the company Sanho Chemical Co. Ltd.); Aradur 9506 (available from the company Huntsman International LLC) and curezol (available from the company Shikoku Chemicals Corporation). The accelerators can also be present in an encapsulated form. Examples of commercially available products are Technicure® LC-80 and Technicure® LC-100 from the company ACCI Specialty Materials.

Apart from the use of the compounds mentioned, the use of photolatent bases is also possible. Examples of possible substance classes are 4-(ortho-nitrophenyl)-dihydropyridine, quaternary organoboron compounds, alpha-am inoacetophenones or amines blocked by photolatent groups. These can release basic compounds by actinic radiation and thus also act as accelerators.

In the composition according to the present invention, the accelerator (F) is preferably present in a proportion of 0.1 wt % to 15 wt % based on the total weight of reactive components (A) to (F).

Component (G): Additives

Apart from components (A) to (F), the compositions according to the present invention can contain further additives (G). Preferred additives (G) are toughness modifiers such as core-shell particles or block copolymers, dyes, pigments, fluorescents, thixotropic agents, thickeners, antioxidants, plasticizers, fillers, flame retardants, corrosion inhibitors, inert and reactive diluents, leveling and wetting additives and adhesion promotors as well as combinations thereof.

Inorganic and organic fillers can be used as fillers. The fillers can be contained in the composition according to the present invention in a proportion of 0 to 90 wt %. All other additives mentioned are preferably present in the compositions according to the present invention in a proportion of 0 to 20 wt % each.

Formulation of the Compositions According to the Present Invention:

A formulation of the one-pack compositions according to the present invention preferably comprises the following components, each based on the total weight of components (A) to (F):

(A) 5-80 wt % of an at least bifunctional epoxy-containing compound;
(B) 15-80 wt % of an at least bifunctional thiol; preferably tris(3-mercaptopropyl)isocyanurate (TMPI) alone or in a mixture with other bifunctional thiols;
(C) 15-50 wt % of an at least bifunctional (meth)acrylate;
(D) 0.1-5 wt % of a photoinitiator;
(E) 0.01-0.5 wt % of a sulfonyl isocyanate (E1) and 0.01-0.5 wt % of an organic acid (E2);
(F) 0.5-15 wt % of a nitrogen compound as an accelerator present in the composition in a solid dispersed form; and
(G) 0 to 90 wt % of fillers and 0.1 to 15 wt % of a thixotropic agent.

According to a preferred embodiment, the formulation consists of the above-mentioned components.

The sulfonyl isocyanate is preferably an aryl sulfonyl isocyanate and particularly preferably toluene sulfonyl isocyanate. As an acid, an acidic phenol is preferably used, particularly preferably pyrogallol.

Use of the Compositions According to the Present Invention

Due to the possibility of light fixation and heat curing at a low temperature, preferably from about 60° C. upwards, the compositions according to the present invention are suitable for fast industrial processes with short cycle times which, at the same time, require thermal stress on the parts involved to be as low as possible.

Thus, another subject of the invention is the use of the compositions according to the present invention as an adhesive or sealant for the bonding, casting, sealing or coating of substrates. Preferably, optical and/or electronic parts are used as substrates. The compositions applied to the parts are preferably cured in a temperature range from 40 to 100° C., particularly preferably from 60 to 90° C., within a period of up to 90 min, preferably within 10 to 90 min.

Joining or Coating Methods Using the Compositions According to the Present Invention The compositions according to the present invention offer the advantage that, in joining processes, the parts can be fixed in their position with respect to each other by irradiation with actinic radiation prior to the heat-curing step.

A respective method for the bonding, casting or coating of substrates by using the compositions according to the present invention preferably comprises the following steps:

a) dosing the composition onto a first substrate;
b) optionally supplying a second substrate to form a substrate composite, wherein the second substrate is brought into contact with the composition;
c) irradiating the composition with actinic radiation; and
d) heat-curing the irradiated composition on the substrate and/or in the substrate composite by heating to a temperature of at least 40° C., preferably 60 to 90° C.

Preferably, heat curing is performed within a period acceptable for industrial processes of up to 90 minutes.

By means of the method according to the present invention, high positional accuracy of the joint parts up to the final curing can be implemented. Thus, conventional fixing aids that are not practicable for miniaturized parts, or that mean unreasonable additional costs, can be dispensed with.

The compositions light-fixed by irradiation have a sufficient strength if a shear strength of at least 0.9 MPa is achieved directly after their irradiation, for example after an exposure for 10 seconds at 200 mW/cm$^2$. Preferably, the shear strength of the light-fixed composition is at least 1.5 MPa. By using a higher exposure intensity, the same light fixation strength can be achieved at shorter exposure times.

In addition, the compositions according to the present invention have short light fixation times and can be fixed in layer thicknesses of 100 μm with radiation intensities of 200 mW/mm$^2$ in at most 15 s, preferably at most 10 s, particularly preferably at most 5 s, with the required shear strength. By using the compositions according to the present invention, light fixation times of down to 0.5 s can be achieved.

Furthermore, the compositions according to the present invention are characterized in that the composition applied to a substrate can be transferred by radiation into a so-called B-stage state. In this state, the composition has a sufficient dimensional and contour stability, and can thus be processed in downstream processes without melting away.

Heat curing of the composition does not have to be performed directly after irradiation with actinic radiation. If the composition according to the present invention in the B-stage state is kept away from environmental impacts, such as moisture, dirt and temperatures above room temperature, heat curing can be performed even after a maximum of 90 days without affecting the properties of the cured composition. Such a method for the bonding, casting or coating of substrates using the compositions according to the present invention preferably comprises the following steps:

a) dosing the composition onto a first substrate;
b) irradiating the composition with actinic radiation;
c) optionally supplying a second substrate to form a substrate composite, wherein the second substrate is brought into contact with the irradiated composition; and
d) heat-curing the substrate and/or the substrate composite by heating to a temperature of at least 40° C., preferably 60 to 90° C.

Between steps b) and c) or b) and d), a waiting period of up to 90 days can be observed without the heat-cured composition, after step d), showing other properties than a composition otherwise cured under the same conditions for which no waiting period was observed.

Measuring Methods and Definitions Used

Irradiation

For irradiation, the compositions according to the present invention were irradiated with an LED lamp DELOUX 20/365 from the company DELO Industrie Klebstoffe GmbH & Co. KGaA at a wavelength of 365 nm with an intensity of 200±20 mW/cm$^2$.

Curing

"Crosslinking" or "curing" is defined as a polymerization or addition reaction beyond the gel point. The gel point is the point at which the storage modulus G' equals the loss modulus G". Curing of the specimen was haptically assessed after 60 min in a convection oven at 60° C. and a short cooling period to room temperature.

Room Temperature

Room temperature is defined as 23±2° C.

Viscosity

Viscosity was measured with a rheometer Physica MCR302 from the company Anton Paar using a standardized measuring cone PP20 at 23° C. with a 200 µm slot, and determined at a shear rate of 10/second. To assess the storage stability at room temperature, the viscosity measurement was repeated after 24 h and 72 h respectively. The compositions according to the present invention are processable over a period of at least 72 h. This criterion is met if the increase in viscosity over a period of 72 h is less than 25% when stored at room temperature. In Tables 1 and 2, under the processing time criterion, the respective compositions are marked with "+". Those not meeting this criterion are marked with "−".

Determination of Light Fixation Strength

Light fixation resistance was determined with a Dage Series 4000 bond tester, available from the company Nordson. To this end, 4×4×4 mm glass cubes were bonded to a 20×20×5 mm FR4 test specimen (layer thickness 100 µm) and the bonding was exposed for 10.0 seconds to an LED lamp DELOLUX 20/365 at a wavelength of 365 nm and with an intensity of 200±20 mW/cm$^2$. Then the shear strength was determined by means of the bond tester after a 5-hour storage in the dark at room temperature.

Manufacturing Examples

To manufacture the one-pack compositions according to the examples given below, the following components were used:

Component (A): At Least Bifunctional Epoxy-Containing Compound

A1: Epikote™ Resin 166 (mixture of bisphenol A and bisphenol F glycidyl ethers, available from the company Hexion)

Component (B): At Least Bifunctional Thiol

B1: tris(3-mercaptopropyl)isocyanurate

B2: Karenz MT PE1 (pentaerythritol-tetrakis(3-mercaptobutylate), available from the company Showa Denko)

Component (C): Radiation-Curing Compound

C1: Photomer 4006 (trimethylolpropane triacrylate, available from the company IGM Resins)

Component (D): Photoinitiator

D1: Irgacure 184 (1-hydroxycyclohexylphenylketone, available from the company BASF SE)

Component (E): Stabilizers

E1: p-toluene sulfonyl isocyanate (available from the company Sigma Aldrich)

E2: pyrogallol (1,2,3-trihydroxybenzene, available from the company Sigma Aldrich)

E3: Desmodur E14 (aromatic isocyanate-containing prepolymer on the basis of toluene diisocyanate (TDI); available from the company Covestro)

E4: Desmodur VP LS 2371 (aliphatic isocyanate-containing prepolymer on the basis of isophorone diisocyanate (IPDI); available from the company Covestro)

E5: Desmodur XP2714 (silane-functional aliphatic polyisocyanate on the basis of hexame-thylene diisocyanate (HMDI); available from the company Covestro)

E6: Tolonate HDT (aliphatic polyisocyanate on the basis of an HMDI trimer; available from the company VencoreX Chemicals)

E7: p-toluene sulfonamide (available from the company Sigma Aldrich)

Component (F): Accelerator

F1: Fujicure FXR-1081 (epoxy-amine adduct; available from the company Sanho Chemical Co. Ltd.)

Component (G): Additives

G1: fumed silica as a thixotropic agent

G2: quartz as a filler

The compositions according to the present invention can be manufactured by mixing the components and homogenizing the mixture, preferably while cooling. During the manufacturing process, in particular during homogenizing, the heat input into the composition must be kept as low as possible. Preferably, the temperature of the composition during manufacture is at most 25° C.

The composition of the thus manufactured one-pack composition according to Examples 1 to 3 as well as Comparative Examples 1 to 2 is indicated in Table 1 below. In addition, the physical properties of the compositions determined according to the measuring methods described above are shown.

TABLE 1

Composition and properties of one-pack compositions

| Component | Example 1 | Example 2 | Example 3 |
|---|---|---|---|
| (A) | 11.0 wt % A1 | 10.3 wt % A1 | 27.3 wt % A1 |
| (B) | 35.1 wt % B1 | 37.6 wt % B2 | 31.2 wt % B1 |
| (C) | 22.8 wt % C1 | 21.4 wt % C1 | 11.0 wt % C1 |
| (D) | 1.2 wt % D1 | 1.2 wt % D1 | 1.2 wt % D1 |
| (E) | 0.2 wt % E1 | 0.1 wt % E1 | 0.2 wt % E1 |
|  | 0.1 wt % E2 | 0.1 wt % E2 | 0.1 wt % E2 |
| (F) | 3.7 wt % F1 | 3.5 wt % F1 | 3.3 wt % F1 |
| (G) | 0.7 wt % G1 | 0.7 wt % G1 | 0.7 wt % G1 |
|  | 25.2 wt % G2 | 25.1 wt % G2 | 25.0 wt % G2 |
| Increase in viscosity after 24 h at RT | 2% | −1% | 2% |
| Processing time ≥72 h (increase in viscosity after 72 h at RT [%]) | + (17%) | + (−2%) | + (14%) |
| Light fixation strength FR4/glass cube, 10 s, 365 nm, 200 mW/cm$^2$ | 4.2 MPa | 2.8 MPa | 0.6 MPa |

| Component | Comparative Example 1 | Comparative Example 2 |
|---|---|---|
| (A) | 11.0 wt % A1 | 10.1 wt % A1 |
| (B) | 35.1 wt % B1 | 35.7 wt % B1 |
| (C) | 22.9 wt % C1 | 23.2 wt % C1 |
| (D) | 1.2 wt % D1 | 1.2 wt % D1 |
| (E) | − | 0.2 wt % E1 |
|  | 0.1 wt % E2 | − |
| (F) | 3.7 wt % F1 | 3.7 wt % F1 |
| (G) | 0.7 wt % G1 | 0.7 wt % G1 |
|  | 25.3 wt % G2 | 25.2 wt % G2 |
| Increase in viscosity after 24 h at RT | 173% | 234% |
| Processing time ≥ 72 h (increase in viscosity after 72 h at RT [%]) | − (n.d., composition cured) | − (n.d., composition cured) |
| Light fixation strength FR4/glass cube, 10 s, 365 nm, 200 nW/cm$^2$ | n.d. | n.d. | n.d. = not determined

Even after 72-hour storage at room temperature, the one-pack composition of Example 1 can still be processed without restrictions, and can be completely cured at 60° C. within 60 min. At the same time, the composition has a high light fixation strength of greater than 4 MPa. Thus, the composition is suitable for use in industrial processes with short cycle times requiring a high light fixation strength at short exposure times.

The one-pack composition of Example 2 contains a polyfunctional thiol on the basis of an ester of 3-mercaptobutyric acid. The composition can still be processed without restrictions after 72-hour storage at room temperature, and has a high light fixation strength of 2.8 MPa.

A sufficient processing time at room temperature and the required fast curing during heating to a temperature of 60° C. or higher can also be achieved by using the one-pack composition of Example 3. The light fixation strength (0.6 MPa) is lower than the light fixation strength achieved in Examples 1 and 2 after a short exposure. The composition is thus suitable for use in standard processes in which the exposure intensity and/or the exposure time can be varied.

The one-pack compositions of Comparative Examples 1 and 2 each contain only one of the components of the stabilizer blend (E) of Examples 1 and 2. In the composition of Comparative Example 1, only an acid (E2) is present, while the composition of Comparative Example 2 contains only the sulfonyl isocyanate (E1) as a stabilizer. In both compositions, the increase in viscosity after 24 h at room temperature is far beyond 100%. After 72-hour storage at room temperature, the compositions are completely cured and thus no longer processable. It is thus only the combination of stabilizers (E1) and (E2) that leads to a sufficient processing time.

Only the composition according to the present invention combines the required properties of a long processing time and, simultaneously, a low curing temperature of 60° C. and, optionally, a high light fixation strength at a short exposure time.

Table 2 indicates the composition of one-pack compositions comprising various stabilizer combinations, and shows the effect of varying the stabilizers on the processability of the respective compositions. The one-pack compositions of Comparative Examples 3 to 6 each contain, as a stabilizer, an acid (2) and various aliphatic or aromatic isocyanates instead of the sulfonyl isocyanate (E1) used in the composition of Example 1. In the composition of Comparative Example 7, a sulfonamide is contained as the stabilizer component.

The one-pack composition of Example 1 shown in Table 1 comprises a combination of stabilizers (E1) and (E2), and shows an increase in viscosity of only 2% after 24 h. After 72 h the increase in viscosity is 17%. The composition thus is still processable even after 3-day storage at room temperature. The one-pack compositions of Comparative Examples 3 to 6 shown in Table 2 that contain, instead of a sulfonyl isocyanate, various other isocyanates as stabilizers, show an increase in viscosity of more than 25% after only 24 h despite an increased isocyanate concentration of 1 wt %. The replacement of the sulfonyl isocyanate (E1) by a sulfonamide (E7) in the composition of Comparative Example 7 also leads to an unsatisfactory processing time. The increase in viscosity after 24 h is already 66%.

The invention claimed is:

1. A one-pack composition that is liquid at room temperature, can be fixed by radiation and cured by heat, comprising:
   (A) an at least bifunctional epoxy-containing compound;
   (B) an at least bifunctional thiol;
   (C) a radiation-curable compound;
   (D) a photoinitiator;
   (E) a stabilizer blend that contains (E1) at least one sulfonyl isocyanate and (E2) at least one acid; and
   (F) a nitrogen compound as an accelerator.

2. The one-pack composition of claim 1, wherein (B) the at least bifunctional thiol comprises an ester-free thiol.

3. The one-pack composition of claim 1, wherein (B) the at least bifunctional thiol comprises a thiol-terminated isocyanurate.

4. The one-pack composition of claim 1, wherein (B) the at least bifunctional thiol comprises or consists of tris(3-mercaptopropyl)isocyanurate.

5. The one-pack composition of claim 1, wherein (C) the radiation-curable compound is present in a proportion of up to 50 wt %, based on a total weight of components (A) to (F).

6. The one-pack composition of claim 1, wherein (C) the radiation-curable compound is present in a proportion of 10 to 50 wt %, based on a total weight of components (A) to (F).

7. The one-pack composition of claim 1, wherein (C) the radiation-curable compound comprises an at least bifunc-

TABLE 2

Variation of stabilizers

| Components | Comparative Example 3 | Comparative Example 4 | Comparative Example 5 | Comparative Example 6 | Comparative Example 7 |
|---|---|---|---|---|---|
| (A) | 10.9 wt % A1 | 10.9 wt % A1 | 10.9 wt % A1 | 10.9 wt % A1 | 11.0 wt % A1 |
| (B) | 34.7 wt % B1 | 34.7 wt % B1 | 34.7 wt % B1 | 34.7 wt % B1 | 35.1 wt % B1 |
| (C) | 22.6 wt % C1 | 22.6 wt % C1 | 22.6 wt % C1 | 22.6 wt % C1 | 22.8 wt % C1 |
| (D) | 1.2 wt % D1 | 1.2 wt % D1 | 1.2 wt % D1 | 1.2 wt % D1 | 1.1 wt % D1 |
| (E) | 1.0 wt % E3 | 1.0 wt % E4 | 1.0 wt % E5 | 1.0 wt % E6 | 0.2 wt % E7 |
|  | 0.1 wt % E2 | 0.1 wt % E2 | 0.1 wt % E2 | 0.1 wt % E2 | 0.1 wt % E2 |
| (F) | 3.7 wt % F1 | 3.7 wt % F1 | 3.7 wt % F1 | 3.7 wt % F1 | 3.7 wt % F1 |
| (G) | 0.7 wt % G1 | 0.7 wt % G1 | 0.7 wt % G1 | 0.7 wt % G1 | 0.7 wt % G1 |
|  | 25.1 wt % G2 | 25.1 wt % G2 | 25.1 wt % G2 | 25.0 wt % G2 | 25.2 wt % G2 |
| Increase in viscosity after 24 h at RT | 77% | 59% | 105% | 42% | 66% |
| Processing time ≥72 h (increase in viscosity after 72 h at RT [%]) | – (n.d.) | – (n.d.) | – (n.d.) | – (n.d.) | – (n.d.) | n.d. = not determined, as composition is cured tional (meth)acrylate and is present in a proportion of 15 to 50 wt %, based on a total weight of components (A) to (F).

8. The one-pack composition of claim 1, wherein (E) the stabilizer blend contains 0.01 to 1 wt % of (E1) the at least one sulfonyl isocyanate and 0.01 to 1 wt % of (E2) the at least one acid, based on a total weight of components (A) to (F).

9. The one-pack composition of claim 1, wherein (E) the stabilizer blend contains 0.01 to 0.5 wt % of (E1) the at least one sulfonyl isocyanate and 0.01 to 0.5 wt % of (E2) the at least one acid based on a total weight of components (A) to (F).

10. The one-pack composition of claim 1, wherein (E1) the at least one sulfonyl isocyanate comprises or consists of p-toluene sulfonyl isocyanate.

11. The one-pack composition of claim 1, wherein (E2) the at least one acid comprises or consists of an acidic phenol.

12. The one-pack composition of claim 1, wherein (E2) the at least one acid comprises or consists of pyrogallol.

13. The one-pack composition of claim 1, wherein (F) the nitrogen compound as an accelerator is a nitrogen compound that is solid at room temperature and is present in a dispersed form in the one-pack composition.

14. The one-pack composition of claim 1, wherein (F) the nitrogen compound as an accelerator comprises a photolatent base.

15. The one-pack composition of claim 1, wherein the composition, based on a total weight of components (A) to (F), comprises the following components:
   5-80 wt % of (A) the at least bifunctional epoxy-containing compound;
   15-80 wt % of (B) the at least bifunctional thiol;
   up to 50 wt % of (C) the radiation-curable compound, which comprises an at least bifunctional (meth)acrylate;
   0.1-5 wt % of (D) the photoinitiator;
   (E) the stabilizer blend containing 0.01-0.5 wt % of (E1) the at least one sulfonyl isocyanate and 0.01-0.5 wt % of (E2) the at least one acid, which comprises at least one organic acid;
   0.5-15 wt % of (F) the nitrogen compound as an accelerator, which is solid at room temperature and is present in a dispersed form in the one-pack composition; and
   (G) 0 to 90 wt % of fillers and 0.1 to 15 wt % of a thixotropic agent.

16. The one-pack composition of claim 1, wherein the composition has an increase in viscosity of less than 25% after storage for at least 24 h, at room temperature.

17. The one-pack composition of claim 1, wherein the composition completely cures at a temperature of 40 to 100° C., within a period of up to 90 min.

18. The one-pack composition of claim 1, wherein the composition has an increase in viscosity of less than 25% after storage for at least 72 h, at room temperature.

19. The one-pack composition of claim 1, wherein the composition completely cures at a temperature from 60° C. to 90° C., within a period of up to 90 min.

20. The one-pack composition of claim 1, which is adapted for use as an adhesive or sealant for bonding, casting, sealing and/or coating of substrates.

21. The one-pack composition of claim 20, wherein the substrate is at least one of an optical, electronic, or opto-electronic part.

22. A method for bonding, casting, sealing and/or coating of substrates using the composition of claim 1, the method comprising:
   a) dosing the composition onto a first substrate;
   b) irradiating the composition with actinic radiation;
   c) optionally supplying a second substrate prior to or after step b) to form a substrate composite, wherein the second substrate is brought into contact with the composition; and
   d) heat-curing the irradiated composition on at least one of the substrate or the substrate composite.

23. The method of claim 22, wherein the composition, after irradiation with actinic radiation, has a shear strength of at least 0.9 MPa.

* * * * *